United States Patent
Farkas et al.

(10) Patent No.: US 10,162,661 B2
(45) Date of Patent: *Dec. 25, 2018

(54) INTERDEPENDENT VIRTUAL MACHINE MANAGEMENT

(71) Applicant: VMware, Inc., Palo Alto, CA (US)

(72) Inventors: Keith Farkas, San Carlos, CA (US);
Elisha Ziskind, Sharon, MA (US);
Joanne Ren, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 14/958,641

(22) Filed: Dec. 3, 2015

(65) Prior Publication Data
US 2016/0085582 A1    Mar. 24, 2016

Related U.S. Application Data

(63) Continuation of application No. 14/094,344, filed on Dec. 2, 2013, now Pat. No. 9,213,572.

(51) Int. Cl.
*G06F 9/455*     (2018.01)
*G06F 9/48*     (2006.01)

(52) U.S. Cl.
CPC .......... *G06F 9/45558* (2013.01); *G06F 9/485* (2013.01); *G06F 9/45533* (2013.01); *G06F 2009/45575* (2013.01)

(58) Field of Classification Search
None
See application file for complete search history.

(56) References Cited

U.S. PATENT DOCUMENTS

| | | |
|---|---|---|
| 8,413,144 B1 | 4/2013 | Manmohan |
| 8,549,516 B2 | 10/2013 | Warfield |
| 8,819,673 B1 * | 8/2014 | Wilkinson .......... G06F 9/45558 718/1 |
| 8,856,585 B2 | 10/2014 | Bauer et al. |
| 8,910,156 B1 | 12/2014 | Kenchammana |
| 2008/0189468 A1 * | 8/2008 | Schmidt ................ G06F 11/203 711/6 |

(Continued)

OTHER PUBLICATIONS

Non-Final Office Action for U.S. Appl. No. 13/920,689, dated Mar. 20, 2015, 25 pages.

(Continued)

*Primary Examiner* — Eric C Wai (57) ABSTRACT

Exemplary methods, apparatuses, and systems determine a list of virtual machines to be subject to a corrective action. When one or more of the listed virtual machines have dependencies upon other virtual machines, network connections, or storage devices, the determination of the list includes determining that the dependencies of the one or more virtual machines have been met. An attempt to restart or take another corrective action for the first virtual machine within the list is made. A second virtual machine that is currently deployed and running or powered off or paused in response to the corrective action for the first virtual machine is determined to be dependent upon the first virtual machine. In response to the second virtual machine's dependencies having been met by the attempt to restart or take corrective action for the first virtual machine, the second virtual machine is added to the list of virtual machines.

20 Claims, 4 Drawing Sheets

(56) References Cited

U.S. PATENT DOCUMENTS

2012/0311576 A1  12/2012  Shu et al.
2013/0275805 A1  10/2013  Harper et al.
2014/0372788 A1* 12/2014  Vavrick ............... G06F 11/0793
                                              714/4.1

OTHER PUBLICATIONS

VMware vCenter Site Recovery Manager 5.1, Product Datasheet, VMware Inc., 2012, 4 pages.

* cited by examiner

INTERDEPENDENT VIRTUAL MACHINE MANAGEMENT

CROSS-REFERENCE TO RELATED APPLICATIONS

This application is a continuation of U.S. patent application Ser. No. 14/094,344, filed Dec. 2, 2013, now U.S. Pat. No. 9,213,572, which is hereby incorporated by reference.

FIELD OF THE INVENTION

The various embodiments described herein relate to the management of interdependent virtual machines. In particular, embodiments relate to taking corrective actions for virtual machines based upon virtual machine dependencies and priorities.

BACKGROUND OF THE INVENTION

Virtualization software, commonly referred to as a hypervisor, enables multiple virtual machines to be executed on a host hardware platform. The hypervisor manages the allocation of computing resources to each virtual machine on the host. An external management server may be used to provision, update, patch, and secure the virtual machines across multiple hosts. The hypervisor restarts virtual machines on the host, e.g., in response to a reboot of the host, a lack of a heartbeat, a request from a virtual machine for remediation, a request from the external management server, etc.

For example, the hypervisor may receive a heartbeat data signal from each virtual machine as an indication of the virtual machine operating normally. If the hypervisor has not received the heartbeat for a period of time, it may be implied that the virtual machine is having a problem. After the period of time has expired, the hypervisor will restart the virtual machine in an effort to return the virtual machine to normal operation.

Virtual machines may be dependent upon other virtual machines, network connections, or storage devices to run properly. For example, a first VM may provide a service that is dependent upon a second VM that manages a database. Restarting the first VM as a part of a corrective action without the second VM running may lead to errors with the first VM.

SUMMARY OF THE INVENTION

Exemplary methods, apparatuses, and systems determine a list of virtual machines to be subject to a corrective action. For example, a first virtual machine is added to the list of virtual machines in response to a determination to initiate a corrective action in response to an error message. The corrective action may include restarting the first virtual machine.

One or more of the listed virtual machines have dependencies upon other virtual machines, network connections, or storage devices. The determination of the list includes determining that the dependencies of the one or more virtual machines have been met. In one embodiment, the list of virtual machines is sorted based upon priority. The first virtual machine is selected to be subjected to the corrective action based upon a position of the first virtual machine within the sorted list.

Exemplary methods, apparatuses, and systems attempt to take a corrective action for a first virtual machine within the list of virtual machines. A second virtual machine is determined to be dependent upon the first virtual machine. The second virtual machine is currently deployed and running or powered off or paused by the corrective action for the first virtual machine. One or more dependencies for the second virtual machine determined to have been met in response to the attempt to restart the first virtual machine or otherwise take a corrective action for the first virtual machine. In response to the second virtual machine's dependencies having been met (e.g., as a result of a successful restart of/corrective action for the first virtual machine or as a result of modifying the dependence), the second virtual machine is added to the list of virtual machines. A restart of or another corrective action for the second virtual machine is attempted as a result of the second virtual machine being added to the list.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include generating a list of one or more virtual machines (VMs) to be subjected to a corrective action. The list of VMs to be subject to a corrective action is generated based upon virtual machines that have their dependencies upon other virtual machines, network connections, storage devices, databases, applications running within other virtual machines, or other resources met. To manage these dependencies, policies describing the relationships between VMs are created and maintained. Policies define dependencies between groups as well as how to remediate the dependent VMs. The dependencies may be used to manage restart order, resets of multiple groups or individual VMs in response to the reset of a group or individual VM, as well as the management of a corrective action for a VM. Dependencies may be expressed with regard to applications, individual VMs, groups of VMs, chains of dependent VMs, etc. As a result, VMs are restarted or otherwise subjected to corrective actions in a manner that reduces errors that result from interdependent VM relationships.

Additionally, the list of VMs to be restarted or subjected to a corrective action may be sorted based upon priority. For example, if a cluster of VMs were to be restarted, priority values may be used to indicate a restart order for independent VMs within the cluster. As a result, VMs are restarted or otherwise subject to corrective actions in an intelligent and efficient manner, e.g., to provide important services first.

Figure 1:
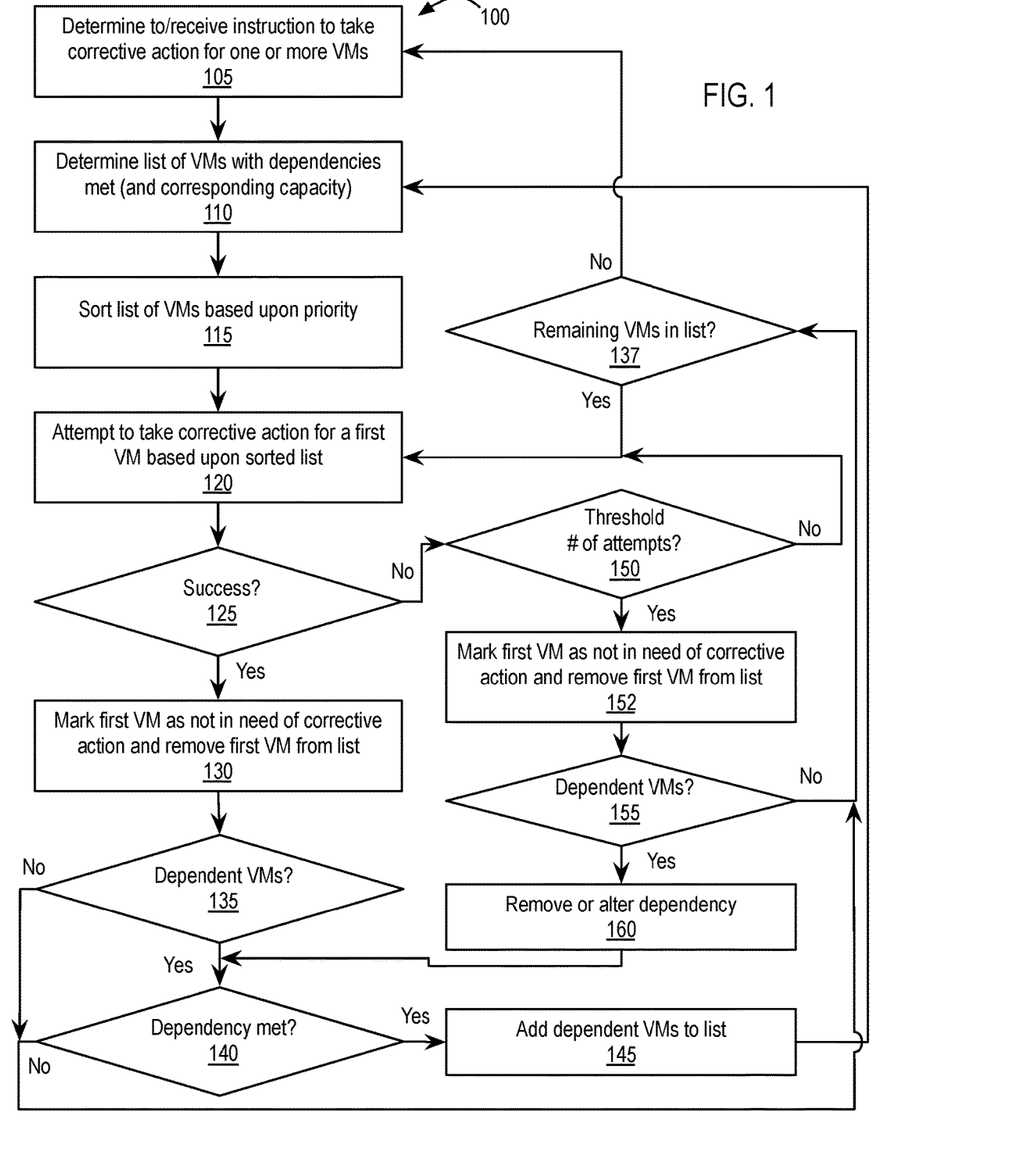
FIG. 1 is a flow chart illustrating an exemplary method of managing interdependent virtual machines.

FIG. 1 is a flow chart illustrating exemplary method 100 of managing interdependent virtual machines. At block 105, a computer determines to or receives an instruction to take a corrective action for one or more VMs. As used herein, a corrective action for a VM refers to one or more of: initiating a reset of the VM on the host device currently running the VM or on another host device within the same management cluster, reconfiguring a setting for the VM, changing the allocation of resources for the VM, moving the VM connection from one storage device to another, restarting an application running in the VM, reverting the VM to a previous snapshot, etc. As used herein, resetting a VM may also be referred to as restarting or rebooting of the virtual machine.

In one embodiment, the determination to take a corrective action is in response to a condition within the host device detected by the hypervisor or detected by another host as in the case of the first host losing power. For example, the hypervisor (or an agent running on the hypervisor) may detect a VM has failed in response to a lack of a heartbeat signal from the VM, from the host on which the VM was running, or that a service upon which a VM is dependent has failed.

Alternatively, the determination to take a corrective action is in response to the hypervisor receiving an error message from a VM. For example, a hypervisor of a host device on which a first VM runs receives an error message from an agent within the first VM. In one embodiment, the error message requests that the hypervisor reset the first VM or perform another specific corrective action. Alternatively, or additionally, the error message includes a state of the operating system or an application running on the first VM or a state of a connection between the first VM and an external resource (e.g., a storage device, a server, a network, etc.). The state of an operating system or application may indicate that the operating system or application is not operating properly. For example, the state of a connection may indicate that a connection is lost or that an external resource is not responding in a timely manner. The error message further indicates a need for the hypervisor to perform a corrective action (e.g., on one or more interdependent VMs). In one embodiment, the hypervisor determines a corrective action to take in response to an error message based upon dependencies between VMs, the content of an error message, and/or other criteria. For example, determining a corrective action may include selecting a corrective action from a database, table, or other data structure storing correlations between corrective actions and one or more of error message content, error message type, software running on the VM, service(s) performed by the VM, VM dependencies, etc. In an embodiment in which the hypervisor determines to take a corrective action of resetting of a VM, the reset may be initiated by the hypervisor in response to the determination rather than, e.g., in response to a VM calling an operating system restart method.

In another embodiment, the hypervisor receives an instruction from another hypervisor (e.g., running on another host device) or from a management server to perform a corrective action on a VM.

At block 110, the computer determines a list of the one or more VMs that have dependencies met. For example, the computer searches dependence policies associated with each VM to be subjected to a corrective action. A dependence policy for a first VM may include, e.g., requiring one or more second VMs to be powered on, running for a period of time, or executing an application prior to taking a corrective action for the first VM. In one embodiment, a dependence policy specifies the other VMs or the resources on which a first VM is dependent and includes directives indicating how the dependencies should be evaluated when taking a corrective action. The dependence policy, however, may not specify the conditions under which a VM or a resource is considered to have met or satisfied the dependence, i.e., when the resource is "ready." For example, the specification of the conditions under which a VM or a resource is considered to have met or satisfied the dependence may be captured in a separate, readiness policy. For example, a VM is ready when the VM is in the power on state, an application inside the VM has sent a signal that the applications in the VM are ready for requests, or an agent running in the VM is issuing heartbeats. In one embodiment, the readiness policy depends on the resource type. For example, if the resource is an application, the resource may be ready when the application is ready to accept requests. In another embodiment, the condition(s) under which a resource or VM is ready are captured within the dependence policy itself. This embodiment offers greater flexibility because, for example, two VMs that depend on a third can define different ready conditions for this third VM. However, this flexibility comes at the cost of greater complexity.

When determining the list of VMs with met dependencies, the computer evaluates the readiness policy of each resource (VM or other resource) on which a given VM depends to determine whether that resource is ready. This evaluation considers the required resources and any optional resources as indicated by the policy parameters. If a VM is not dependent upon any other resource, the computer determines that the VM's dependencies are met.

In one embodiment, one or more dependence policies for one corrective action for a VM, may differ from the one or more dependence policies for taking another corrective action for the VM. For example, restarting a VM may trigger one set of dependence policies while simply restarting an application running on the VM may trigger a different set of dependence policies. Restarting the VM may affect other VMs dependent upon the VM running generally while restarting an application affects only those VMs that are dependent upon that application.

Figure 2:
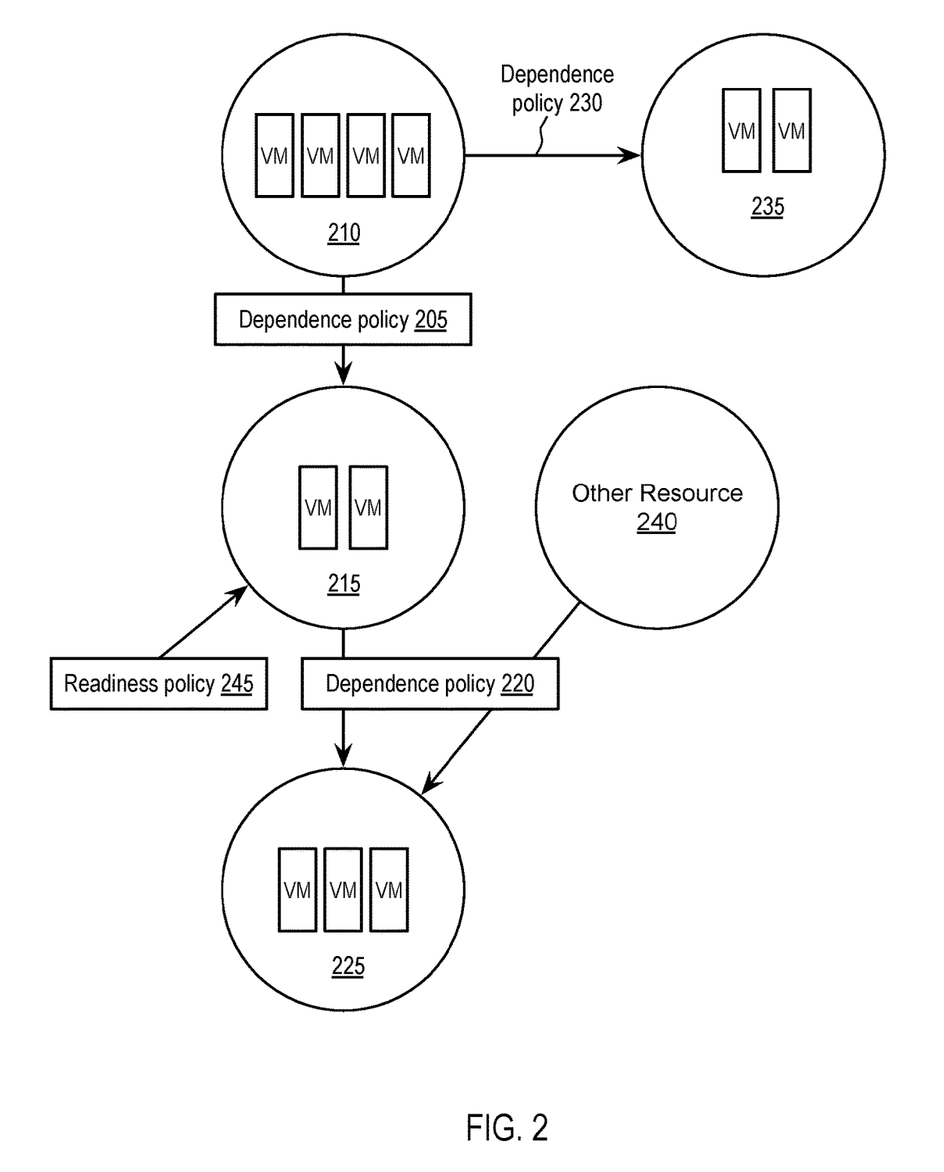
FIG. 2 illustrates, in block diagram form, exemplary interdependent relationships between groups of virtual machines.

FIG. 2 illustrates, in block diagram form, exemplary interdependent relationships between groups of virtual machines. Dependence policy 205 defines a relationship between VM group 210 and VM group 215. For example, dependence policy 205 may require that three of the four VMs in group 210 are running prior to restarting the VMs in group 215. If three of the four VMs in group 210 are running, the computer may determine that one or more VMs in group 215 have their dependencies met.

In one embodiment, dependence policy 205 may indicate which three of the four VMs in group 210 are required to be running. For example, one VM in group 210 may be a mirror/secondary VM of another/primary VM in group 210. Dependence policy 205 may require that only one of these two VMs be running. A dependence policy of this type may be expressed in Boolean operators or other conditional terminology to define how many and which VMs are required to satisfy the dependence policy.

In another embodiment, dependence policy 205 defines varied levels of dependency for one or more VMs. For example, dependence policy 205 may define one or more VMs as being required, preferred, optional, etc. Using these levels of dependency, the computer determines if dependence policy 205 may be removed or altered, as described below with reference to block 160 of FIG. 1.

In one embodiment, a given VM is considered ready when any of the specified conditions are true for that VM. One or more classes, or other object-oriented models, establish values for the determination of readiness. Exemplary readiness policy values include 1) a specification that the VM be powered on, 2) a specification that the heartbeat status of the VM be healthy, and 3) a specification that an agent in the VM's operating system issued a message indicating the application(s) is ready. Additionally, a delay value may be established to represent that a VM is ready only after the ready condition is met and a specified, subsequent time delay has occurred. In an embodiment in which the dependence includes a web service as a resource, additional values include a uniform resource identifier (URI) and authentication certificate for the web service. The web service is deemed ready after the URI reports the web service as ready and, if applicable, the specified time delay has occurred. In one embodiment, determining the status of a corresponding resource includes executing a script identified within the class.

An exemplary dependence policy includes a listing of unique identifiers of the VMs to which the dependence policy applies. Additionally, the dependence policy defines a first corrective action to take when a defined event occurs to a resource on which the set of VMs depend. For example, the policy may specify that a VM should be restarted if a VM on which it depends is restarted, while the VM should be relocated to another datastore if the VM on which it depends is so relocated. For example, the dependence policy may include 1) a Boolean expression that identifies resources to be monitored for, 2) a first corrective action to be applied to dependent VMs if the expression evaluates to true, and 3) a delay to allow to expire before the first corrective action is applied to the dependent VMs.

Multiple resource and event pairs may be combined using Boolean statements. For example, a dependence policy may be triggered by a restart event of a first resource or a failure event of an application running within a second resource. These two resource and event pairs would be combined using the Boolean "OR" operator.

Upon detecting that a condition defined in one or more resource and event pairs is true, the computer applies the first corrective action defined by the dependence policy. For example, the above-referenced restart of a first resource may be defined to trigger the powering off a dependent VM. Exemplary first corrective actions include taking no action, powering off the VM, pausing the VM, and sending a signal to an agent running within the VM.

In one embodiment, the dependence policy further defines a delay. The computer allows the defined delay to expire following the detection of the one or more resource and event pairs as being true and prior to applying the first corrective action to the dependent VM as defined by the dependence policy. During this delay, the computer evaluates if corresponding dependencies are met (as described further below). If the dependencies are not met at the end of the delay, the computer implements the above-referenced first corrective action. This delay allows for resource events that may be quickly corrected to be resolved without taking unnecessary action on a dependent VM.

The dependence policy may further define a second corrective action to take after the computer completes remediating the one or more events that initially triggered the policy, and which led to the application of the first corrective action. In one embodiment, this second corrective action is defined by 1) dependencies that are to be met prior to taking the second corrective action, 2) the second corrective action to take when the dependencies are met, 3) a period of time to wait before declaring whether or not the dependencies have been met. Similar to the resource and corrective action pairs described above, the dependencies may be expressed in combination using Boolean operators. For example, Boolean operators may be used to define that at least N of M resources are to be ready to satisfy a given dependence. The expression variables for a given dependency include the unique identifiers for the resource(s) upon which the VM or group of VMs depends and their corresponding readiness (as described above).

If the dependencies are met within the period of time, the second corrective action is taken. For example, a dependent VM may have been powered down in response to a resource being restarted, as described above. Once the resource has been restarted and meets its readiness policy, the second corrective action of powering the dependent VM back on is performed. Exemplary second corrective actions include taking no action, restarting the VM, rebooting the VM's operating system, and sending a signal to an agent running within the VM.

In one embodiment, the dependence policy further defines a number of attempts to meet the dependencies before taking action. For example, if the dependency is not met within the defined period of time, the computer may evaluate the dependencies a defined number of additional times before proceeding with the second corrective action (despite dependencies not being met) or performing an alternative corrective action.

Additionally, dependence policy 220 defines a relationship between VM group 215 and VM group 225. Dependence policy 220 may be defined in a manner similar to the description above. For example, dependence policy 220 may require that an application be running on a VM in group 215 prior to performing a corrective action on a VM in group 225. As described above, the resource upon which a VM is dependent may be defined as ready by the dependence policy (e.g., dependence policy 220) or in a separate readiness policy (e.g., readiness policy 245). For example, one or both VMs in group 215 may be defined, by readiness policy 245, as being ready when the required application is running or sends a ready signal or otherwise provides an indication of readiness. Alternatively, each VM in group 215 may have a different readiness policy 245. Dependence policies 205 and 220 create a chain of dependencies, such that group 225 is dependent upon group 215, which is dependent upon group 210. As a result, group 225 is indirectly dependent upon group 210.

In one embodiment, dependence policy 220 defines a dependence relationship with another resource 240 (i.e., a resource other than a VM). For example, dependence policy 220 may require that resource 240 (e.g., a database) be running prior to restarting a VM in group 225.

In one embodiment, more than one VM or group of VMs is dependent upon another VM or group. For example, dependence policy 230 defines a relationship between group 210 and group 235. As a result, both group 215 and group 235 are dependent upon group 210. Dependence policy 230 may be defined in a manner similar to the description above. The nature of the dependence policies 205/230, however, may differ. Continuing with the example above, dependence policy 205 may require that three of the four VMs in group 210 are running prior to restarting the VMs in group 215. On the other hand, dependence policy 230 may require less VMs in group 210 to be running, all VMs in group 210 to be running, an application be running on one or more VMs in group 210, etc. Alternatively, dependence policies 205 and 230 may have similar requirements.

In one embodiment, the determination of the list of one or more VMs (as described with reference to block 110) includes determining if a corresponding host device has the capacity to implement the corrective action on a VM. For example, a host device may be limited in the number of VMs that are able to run on the host. As a result, the computer may initiate and/or wait for a lower priority VM to be powered down to provide the needed capacity. Additionally, limits may be set on processing, networking, storage, or other services provided to VMs within particular hosts, clusters, networks, etc. In yet another example, a VM may need to be restarted as a result of a failure of its host device. If the host device has not returned to normal operation, the computer may determine a lack of capacity to restart the VM or select a host device with the requisite capacity to restart the VM.

Returning to FIG. 1, at block 115, the computer sorts the list of VMs that are to be subject to a corrective action based upon priority. This list of VMs includes two sets of VMs: (1) VMs with all their required dependencies met and (2) VMs that are not part of a dependence relationship. In one embodiment, the sorting of VMs in the list or within the two sets takes into account one or both of user-assigned VM priorities and the dynamic importance of a VM.

Priorities indicate which VMs are to be subjected to a corrective action prior to other VMs. For example, a VM acting as a dynamic host configuration protocol (DHCP) server or managing access to critical storage may have a high priority. Additionally, a VM with a greater number of dependencies may have a higher priority than other VMs. In one embodiment, required, preferred, and optional VMs or services may have, respectively, high, medium, and low priority values. In one embodiment, individual VMs are assigned priorities. Additionally, or alternatively, groups of VMs are assigned priorities.

In one embodiment, after sorting VMs by priority, the computer ensures that VMs within the same priority group with higher dynamic importance are remediated first. For example, the computer first sorts the VMs that are to be remediated within a priority group by the number of VMs that have a required dependence on each of the these VMs, then by the number of VMs that have an optional dependence on each of these VMs, and then by the VM size. Other sorting approaches are also possible. For example, in an alternate embodiment, the VMs are first sorted by the number of other VMs that require this first VM, then by priority order, then by the number of other VMs with optional dependences, and finally by size.

At block 120, the computer attempts to restart a first VM or take a corrective action for the first VM based upon the sorted list. For example, the computer determines the first VM has its dependencies met and to be of higher priority than other VMs in the sorted list (if any). While block 120 refers to taking a corrective action for a first VM, multiple VMs may be subjected to a corrective action in parallel.

As described above, in one embodiment, the computer additionally determines if any VMs that are dependent upon the first VM are to be stopped or paused, or have an application stopped or paused, prior to the attempt. For example, if the first VM is within group 210, the computer may inspect dependence policies 205 and 230 to determine if one or more VMs within groups 215 and 235 are to be stopped/paused prior to attempting to take or as a part of taking a corrective action for the first VM. Additionally, if a VM dependent upon the first VM is stopped/paused prior to/as a part of attempting to take corrective action for the first VM, the dependent VM is marked as being in need of corrective action (e.g., to restart or resume the dependent VM once the first VM has been restarted or successfully subjected to a corrective action). In one embodiment, if multiple VMs are to be stopped/paused, the computer utilizes dependence policies 205 and 230 to determine an order in which the VMs are stopped/paused. For example, VMs may be stopped in a reverse order of the order of the dependence chain.

At block 125, the computer determines if the attempt to perform the corrective action for the first VM was a success. The determination of success may be dependent upon each VM and, if applicable, the defined readiness policy. Exemplary indications of success include the first VM being powered on, receipt of a heartbeat from the first VM, the passage of a configurable period of time following the restarting of the first VM or an application running on the first VM, and a signal from an application running on the first VM.

If the attempt was successful, at block 130, the computer marks the first VM as not being in need of corrective action and removes the first VM from the list of one or more VMs to subject to a corrective action. At block 135, the computer determines if any VMs that are to be subjected to a corrective action are dependent upon the first VM or a group that includes the first VM. For example, if the computer successfully restarted a VM within group 210, it may determine that one or more VMs in groups 215 and 235 are dependent upon the VM/group 210. As described above, a VM dependent upon the first VM may have been stopped or paused prior to taking the corrective action and marked as being in need of a corrective action. Alternatively, a dependent VM may have continued running and a dependence policy requires the computer to attempt to restart or take another action on the dependent VM following the successful corrective action on the first VM. In another embodiment, the computer may have previously determined to take a corrective action on the dependent VM, but the dependent VM had not previously had all dependencies met.

If no VMs that are to be subjected to a corrective action are dependent upon the first VM or a group that includes the first VM, at block 137, the computer determines if any VMs remain in the list. If VMs remain in the list, method 100 returns to block 120 to continue attempting corrective actions as needed. If no VMs remain in the list, method 100 returns to block 105.

Otherwise, if there are one or more dependent VMs to be subjected to a corrective action at block 135, the computer determines if the dependencies for the dependent VMs have been met at block 140. Returning again to the example above, dependence policy 205 may require that three of the four VMs in group 210 are running prior to restarting the VMs in group 215. If restarting the first VM brought group 210 up to three or more running VMs, the computer determines that a VM in group 215 has its dependencies met (assuming no other unmet dependences). If restarting the first VM only brought group 210 up to one or two running VMs, the computer determines that a VM in group 215 does not have its dependencies met.

If the dependencies have not been met, method 100 proceeds to block 137 as described above. Otherwise, if the dependencies have been met, at block 145, the dependent VMs are added to the list of VMs to be subjected to a corrective action and the method returns to block 110.

If the attempt to perform a corrective action for the first VM was not successful at block 125, the computer optionally determines if a threshold number of attempts has been reached at block 150. For example, if repeated attempts to take an action on the first VM fail, it may be beneficial to attempt to move forward and address VMs that are dependent upon the first VM. In one embodiment, the threshold is included as a part of the corresponding dependence policy.

If the threshold has not been reached, method 100 returns to block 120. If the threshold has been reached, at block 152, the computer marks the first VM as not being in need of corrective action and removes the first VM from the list of one or more VMs to subject to a corrective action. At block 155, the computer determines if any VMs that are to be subjected to a corrective action are dependent upon the first VM or a group that includes the first VM. If no VMs that are to be subjected to a corrective action are dependent upon the first VM or a group that includes the first VM, method 100 proceeds to block 137 as described above. Otherwise, if there are one or more dependent VMs to be subjected to a corrective action, at block 160, the dependency upon the first VM is removed or the dependency upon the group including the first VM is removed or altered. In one embodiment, if repeated attempts to apply the action fail, the system applies a secondary action such as powering off the VMs so as to make capacity available to others. Returning again to the example above, dependence policy 205 may require that three of the four VMs in group 210 are running prior to restarting the VMs in group 215. If the first VM is a part of group 210, the dependence policy may be altered to only require two of the four VMs in group 210 to be running. As described above, dependencies may be set to different levels. For example, an optional or preferred dependence policy may be removed or altered in response to a threshold number of unsuccessful attempts at block 160. In one embodiment, a different threshold number is used for different levels of dependency (e.g., optional vs. preferred). In one embodiment, a required dependence policy may not be removed or altered at block 160.

Upon removing or altering the dependency (if permitted), method 100 continues at block 140 to determine if the dependencies for the one or more VMs with a removed or altered dependence policy otherwise has all dependencies met. For example, if the only unmet dependency for a VM has altered or removed as described above, the computer determines that the VM's dependencies have been met. If the dependencies have not been met, method 100 proceeds to block 137 (as described above). If the modified dependencies have been met, the one or more dependent VMs are added to the list at block 145 and method 100 returns to block 110.

Figure 3:
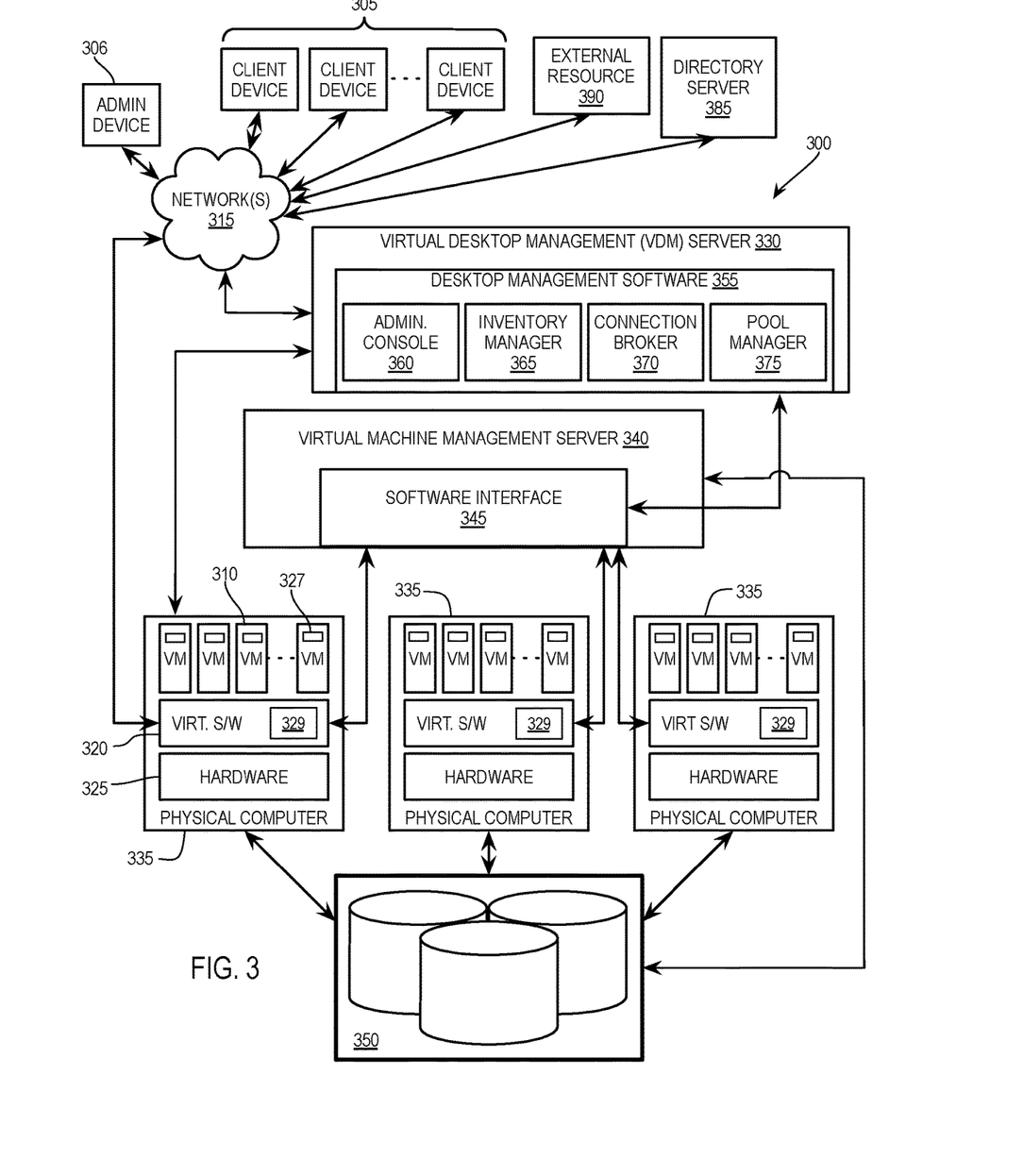
FIG. 3 illustrates, in block diagram form, an exemplary virtual infrastructure environment including one or more processing systems to implement interdependent virtual machine management.

FIG. 3 illustrates, in block diagram form, exemplary virtual infrastructure environment 300 including one or more processing systems to implement interdependent virtual machine management as described herein. Server-based computing in a virtual infrastructure environment allows client devices 305 to access centrally-managed user virtual desktops, such as those implemented by VMs 310 running in a datacenter, via network(s) 315 (e.g., a local area network or other private or publically accessible wide area network, such as the Internet). For example, client device 305 and VM 310 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 310.

The term "desktop," as used herein, refers to a human interface environment through which users can launch, interact with, and manage applications, settings, and/or data, etc. A virtual desktop is a virtual computing system that operates as a desktop or workstation computer with which an end user can interact using desktop remoting protocol and the software and/or hardware of client device 305. A virtualized desktop may export user interfaces, e.g., keyboard and mouse input, audio and visual output, to client device 305 from VM 310 running remotely (in the datacenter) or locally on client device 305, or, in some cases, using a hybrid. Client device 305 transmits user input, e.g., keyboard or mouse input, to VM 310 to be processed, and receives display and other data, such as sound, from VM 310 for presentation to a user of client device 305. Client device 305 presents a bitmap representation of the desktop generated by VM 310. Inputs to and outputs from the virtualized desktop are reflected in the bitmap representation on client device 305 as it occurs on the virtualized desktop within VM 310.

VMs 310 are complete computation environments, containing virtual equivalents of the hardware and system software components of a physical system. For example, these virtual equivalents appear as a complete physical machine to a guest operating system running within VM 310. VMs 310 are typically implemented by an extensive virtualization infrastructure, which includes a variety of software and hardware components. Virtualization software layer 320 (e.g., a hypervisor) running on hardware 325 of physical computer 335 manages one or more VMs 310. Virtualization software layer 320 manages physical resources, e.g., hardware 325, as well as maintains virtual-to-physical hardware mappings. VMs 310 implement virtual desktops, as described above, or other services. For example, VMs 310 may act as servers, manage databases, perform load balancing, provide a firewall, etc.

VMs 310 each include VM agent 327. VM agent 327 may generate error messages, as described above. For example VM agent 327 monitors the state of an application or operating system of the VM 310, the state of a connection between the VM 310 and another device (physical or virtual device), or the VM 310 performance with regard to a dependence policy. VM agent 327 further transmits an error message to the virtualization software layer 320.

Additionally, virtualization software layer 320 includes availability agent 329. For example, availability agent 329 receives an error message from VM agent 327 and initiates the corrective action for a VM 310 or modifies a policy in response to an attempt to take a corrective action. Additionally, availability agent 329 implements one or more dependence policies and/or readiness policies as described above with reference to FIGS. 1 and 2. For example, availability agent 329 may check the status of a resource upon which a corresponding VM depends (e.g., by requesting information from another availability agent, requesting information from a management server 330/340, executing a script, requesting information from a URI, etc.).

In one embodiment, VM agent 327 transmits the error messages to availability agent 329 via a trusted communication channel between VM agent 327 and availability agent 329. Additionally, VM agent 327 may transmit messages to availability agent 329 via the trusted communication channel to indicate the success of a corrective action (e.g., that an application is successfully running). The trusted communication channel provides VM agent 327 direct access to availability agent 329, or, more generally, virtualization software layer 320 independently of the guest operating system, a virtual networking interface, or similar means for transmitting information from VM 310 to virtualization software layer 320. Avoiding reliance upon the guest operating system enables VM agent 327 to transmit a message to availability agent 329 when the guest operating system is non-responsive. Avoiding reliance upon a virtual networking interface enables VM agent 327 to transmit a message to availability agent 329 without using networking protocols and authentication that may slow down the transmission of the message. For example, VM 310 does not need an Internet Protocol (IP) address for the hypervisor or another management solution to transmit the message or credentials to log in or otherwise authenticate the transmission of the message. Additionally, VM 310 does not need to include a networking identification of VM 310 in the error message. In one embodiment, VM agent 327 runs at a root authentication level to enable direct communication (e.g., using Transmission Control Protocol/Internet Protocol (TCP/IP) or another network protocol) with availability agent 329, or more generally virtualization software layer 320. In an additional embodiment, the trusted communication channel is implemented using shared memory. VM agent 327 writes the message to the shared memory and availability agent 329/virtualization software layer 320 reads the message from the shared memory.

Remote access to virtualized desktops is generally provided to client devices 305 through virtual desktop management (VDM) server 330. The VDM server 330 provides virtual desktop access to the client devices 305 and manages the corresponding VMs 310 through communications with software interface 345 of virtual machine management server (VMMS) 340. VMMS 340 is responsible for provisioning and maintaining the multitude of VMs 310 implemented across one or more physical computers (hosts) 335 as well as storage 350 utilized by VMs 310.

VMMS 340 also provides software interface 345 to enable an administrator or other entity, such as inventory manager 365, connection broker 370, and pool manager 375, to access and manage VMs 310. In one embodiment, availability agents 329 of each host 335, or virtualization software layers 320 of each host 335 communicate with one another (e.g., via VMMS 340 or a direct communication path). Communication between availability agents 329, e.g., enables availability agent 329 of a first host 335 to initiate a reset of, or other corrective action for, VM 310 on a second host 335 or move a VM 310 between hosts 335. Additionally, availability agents 329 may communicate with regard to dependencies between VMs 310 on different hosts 335. For example, agent 329 on a first host 335 (or another resource) may send a message to agent 329 on a second host 335 to indicate an event occurred for a resource upon which a VM 310 running on second host 335 depends that may affect the dependency.

In one embodiment, one availability agent 329 is elected as a master and coordinates all activities related to performing corrective actions for VMs 310. For example, master availability agent 329 may receive dependence policies or instructions to perform corrective actions for VMs 310. In response, master availability agent 329 distributes the dependence policies or instructions to availability agents 329 on other host devices 335. In one embodiment, master availability agent 329 performs at least a portion of method 100 for VMs 310 on other host devices 335 (e.g., blocks 105-115). If master availability agent 329 should fail, another availability agent 329 is elected master.

VDM server 330 may be a physical computer system or a virtual machine that runs desktop management software 355. Desktop management software 355 within VDM server 330 manages pools of computer resources to run VMs 310 on a set of clusters typically including multiple servers/physical computers 335 with central/graphics processing units (CPU's and/or GPU's), memory, and communications hardware. Desktop management software 355 includes a number of modules, e.g., including administrative console 360, inventory manager 365, connection broker 370, and pool manager 375.

Administrative console 360 provides a remotely-accessible user interface to administrator device 306 to manage the configuration of virtual desktops within the virtual infrastructure. Administrative console 360 allows administrator device 306 to perform a plurality of functions, such as: create desktop pools, associate desktop pools with VDM server 330, associate a desktop pool with a master image, starting a VM 310, resetting a VM 310, set storage overcommit settings for different data stores 350 used by desktop pools, and other similar operations. In one embodiment, an administrator defines or maintains a dependence policy or priority via administrative console 360. Alternatively, a dependence policy or priority is defined by default (e.g., based upon a type of service provided by a VM 310).

Inventory manager 365 handles events received from the virtual desktops. When a user logs off or disconnects, VM 310 sends a notification to inventory manager 365. Inventory manager 365 may also use timer-based events to schedule effective maintenance operations. Inventory manager 365 determines an effective policy that applies to the desktop and performs a maintenance operation, if required.

Connection broker 370 allows a remote user or administrator, through a client device 305 or administrator device 306, to select a type of virtual desktop and initiate a virtual desktop session or to access an existing connection to a virtual desktop. In one embodiment, connection broker 370 connects to VM 310 to access or update policies and priorities associated with VM 310 (e.g., including dependence policies described with reference to FIG. 2).

Pool manager 375 manages the lifecycle of virtual desktops. Virtual desktops in a pool are grouped together based on similar software requirements. Additionally, virtual desktops may be grouped together based upon dependence policies. Desktop Administrators create logical desktops groups (desktop pools) that are provisioned typically from the same base image, including software agent 327. For example, a desktop pool may include VMs 310 that run the same set of software applications and run the same guest operating system.

Directory server 385 stores a persistent state for managing the virtual desktops. For example, one or more VMs 310 (e.g., in a desktop pool) may be associated with a dependence policy and priority. The policies and priorities for VMs 310 may be stored in directory server 385 and accessed when VM 310 is provisioned. When a VM 310 is started, reset, or moved, directory server 385 provides the policy and priority to master availability agent 329 or the corresponding virtualization software layer 320 for managing the VM 310. In one embodiment, the dependence policies and priorities described herein are stored in one or more of VDM server 330, VMMS 340, data store(s) 350, and/or directory server 385.

In one embodiment, directory server 385 additionally contains information for one or of: names of desktop pools, the number of desktops required in a pool, default power state of a pool, pool creation date, etc.; disk type for VM 310; disk replication; details of VMs 310 created in the pools; unique identifiers for user accounts; external references to external directories; entitlements including mappings between users, applications, and desktops; policies including indications of types of devices available, default display configurations, etc.; and audit events. Directory server 385 may be an instance of Active Directory, a product available from Microsoft Corp., or may be implemented by another suitable product such as an LDAP server.

External resource 390 is an exemplary device that provides a resource to one or more VMs 310. For example, a VM 310 may be dependent upon a web service provided by external resource 390 (as described above) that is not implemented by a VM or at least not implemented by a VM 310 managed by VDM server 330 or VMMS 340 as a part of virtual infrastructure environment 300. Exemplary external resources 380 include a storage device, a server, a network, etc.

Figure 4:
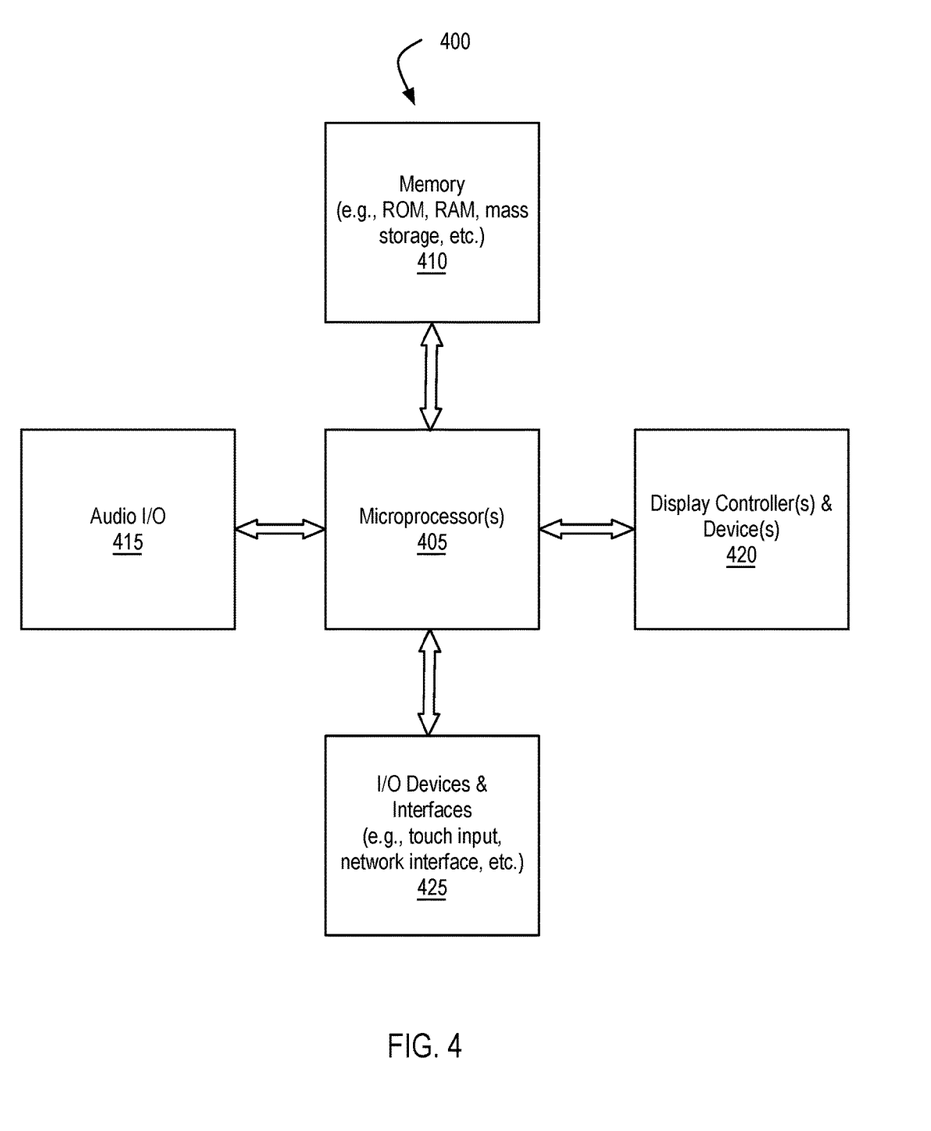
FIG. 4 illustrates, in block diagram form, an exemplary processing system to implement interdependent virtual machine management.

FIG. 4 illustrates, in block diagram form, exemplary processing system 400 to implement interdependent virtual machine management as described herein. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory. In one embodiment, memory 410 includes shared memory used to implement a trusted communication channel between VM agent 327 and availability agent 329, as described above. In one embodiment, memory 410 includes storage for the dependence policies and priorities described above.

Data processing system 400 also includes audio input/output subsystem 415 which may include a microphone and/or a speaker for, for example, playing back music or other audio, receiving voice instructions to be executed by microprocessor(s) 405, playing audio notifications, etc. Display controller and display device 420 provides a visual user interface for the user.

Data processing system 400 also includes one or more input or output ("I/O") devices and interfaces 425, which are provided to allow a user to provide input to, receive output from, and otherwise transfer data to and from the system. I/O devices 425 may include a mouse, keypad or a keyboard, a touch panel or a multi-touch input panel, camera, optical scanner, network interface, modem, other known I/O devices or a combination of such I/O devices.

I/O devices and interfaces 425 may also include a port, connector for a dock, or a connector for a USB interface, FireWire, Thunderbolt, Ethernet, Fibre Channel, etc. to connect the system 400 with another device, external component, or a network. Exemplary I/O devices and interfaces 425 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

It will be appreciated that one or more buses, may be used to interconnect the various components shown in FIG. 4.

Data processing system 400 is an exemplary representation of one or more of the client device 305, administrator device 306, VDM server 330, physical computer 335, VMMS 340, and directory server 385 described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented method 100 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 425. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
    attempting to restart a first virtual machine within a list of virtual machines or take another corrective action for the first virtual machine, wherein the first virtual machine is added to the list of virtual machines in response to a failure indication from the first virtual machine or another virtual machine dependent upon the first virtual machine;
    determining that a second virtual machine is dependent upon the first virtual machine;
    determining that one or more policies for the second virtual machine have been met in response to the attempt to restart or take the corrective action for the first virtual machine, wherein the one or more policies define at least one dependency that is used to manage a restart order of the first virtual machine and the second virtual machine; and
    attempting to restart the second virtual machine or take another corrective action for the second virtual machine in response to the determination that the one or more policies for the second virtual machine have been met.

2. The computer-implemented method of claim 1, further comprising:
    determining the list of virtual machines to be subject to a corrective action, the list including the first virtual machine, wherein when one or more of the listed virtual machines have dependencies upon other virtual machines, network connections, or storage devices, the determination of the list includes determining that the dependencies of the one or more virtual machines have been met, wherein restarting the second virtual machine or taking another corrective action for the second virtual machine is a result of adding the second virtual machine to the list of virtual machines.

3. The computer-implemented method of claim 2, further comprising:
    sorting the list of virtual machines based upon priority; and
    selecting the first virtual machine to be subjected to the corrective action based upon a position of the first virtual machine within the sorted list.

4. The computer-implemented method of claim 2, wherein the dependencies for one of the listed virtual machines when the virtual machine is to be subjected to a first corrective action differs from the dependencies for the virtual machine when the virtual machine is to be subjected to a second corrective action.

5. The computer-implemented method of claim 2, wherein the first virtual machine is dependent upon an external resource and wherein the determination of the list includes determining that dependency of the first virtual machine upon the external resource has been met.

6. The computer-implemented method of claim 1, wherein attempting to take the corrective action for the first virtual machine includes pausing or stopping the second virtual machine or an application executing within the second virtual machine.

7. The computer-implemented method of claim 1, further comprising:
    determining that a threshold number of unsuccessful attempts to take a corrective action for the first virtual machine has been reached; and
    modifying the one or more dependencies for the second virtual machine to remove or alter the dependency upon the first virtual machine, wherein the one or more dependencies for the second virtual machine are determined to have been met after removing or altering the dependency upon the first virtual machine.

8. The computer-implemented method of claim 1, wherein the dependence between the first virtual machine and the second virtual machine includes a Boolean expression that identifies the first and second virtual machines and an event that triggers the dependence policy.

9. The computer-implemented method of claim 1, wherein the failure indication is one of: an error message and a lack of a heartbeat signal.

10. A non-transitory computer-readable medium storing instructions, which when executed by a processing device, cause the processing device to perform method comprising:
    attempting to restart a first virtual machine within a list of virtual machines or take another corrective action for the first virtual machine, wherein the first virtual machine is added to the list of virtual machines in response to a failure indication from the first virtual machine or another virtual machine dependent upon the first virtual machine;
    determining that a second virtual machine is dependent upon the first virtual machine;
    determining that one or more policies for the second virtual machine have been met in response to the attempt to restart or take the corrective action for the first virtual machine, wherein the one or more policies define at least one dependency that is used to manage a restart order of the first virtual machine and the second virtual machine; and
    attempting to restart the second virtual machine or take another corrective action for the second virtual machine in response to the determination that the one or more policies for the second virtual machine have been met, wherein attempting to restart the second virtual machine or taking another corrective action for the second virtual machine is a result of adding the second virtual machine to the list of virtual machines.

11. The non-transitory computer-readable medium of claim 10, the method further comprising:
    determining the list of virtual machines to be subject to a corrective action, the list including the first virtual machine, wherein when one or more of the listed virtual machines have dependencies upon other virtual machines, network connections, or storage devices, the determination of the list includes determining that the dependencies of the one or more virtual machines have been met, wherein restarting the second virtual machine or taking another corrective action for the second virtual machine is a result of adding the second virtual machine to the list of virtual machines.

12. The non-transitory computer-readable medium of claim 11, the method further comprising:
    sorting the list of virtual machines based upon priority; and
    selecting the first virtual machine to be subjected to the corrective action based upon a position of the first virtual machine within the sorted list.

13. The non-transitory computer-readable medium of claim 11, wherein the dependencies for one of the listed virtual machines when the virtual machine is to be subjected to a first corrective action differs from the dependencies for the virtual machine when the virtual machine is to be subjected to a second corrective action.

14. The non-transitory computer-readable medium of claim 11, wherein the first virtual machine is dependent upon an external resource and wherein the determination of the list includes determining that dependency of the first virtual machine upon the external resource has been met.

15. The non-transitory computer-readable medium of claim 10, wherein attempting to take the corrective action for the first virtual machine includes pausing or stopping the second virtual machine or an application executing within the second virtual machine.

16. The non-transitory computer-readable medium of claim 10, the method further comprising:
   determining that a threshold number of unsuccessful attempts to take a corrective action for the first virtual machine has been reached; and
   modifying the one or more dependencies for the second virtual machine to remove or alter the dependency upon the first virtual machine, wherein the one or more dependencies for the second virtual machine are determined to have been met after removing or altering the dependency upon the first virtual machine.

17. The non-transitory computer-readable medium of claim 10, wherein the dependence between the first virtual machine and the second virtual machine includes a Boolean expression that identifies the first and second virtual machines and an event that triggers the dependence policy.

18. The non-transitory computer-readable medium of claim 10, wherein the failure indication is one of: an error message and a lack of a heartbeat signal.

19. An apparatus comprising:
   a processing device; and
   a memory coupled to the processing device, the memory storing instructions which, when executed by the processing device, cause the apparatus to:
attempt to restart a first virtual machine within a list of virtual machines or take another corrective action for the first virtual machine, wherein the first virtual machine is added to the list of virtual machines in response to a failure indication from the first virtual machine or another virtual machine dependent upon the first virtual machine;
   determine that a second virtual machine is dependent upon the first virtual machine;
   determine that one or more policies for the second virtual machine have been met in response to the attempt to restart or take the corrective action for the first virtual machine, wherein the one or more policies define at least one dependency that is used to manage a restart order of the first virtual machine and the second virtual machine; and
   attempt to restart the second virtual machine or take another corrective action for the second virtual machine in response to the determination that the one or more policies for the second virtual machine have been met.

20. The apparatus of claim 19, wherein executing the instructions further causes the apparatus to:
   determine that a threshold number of unsuccessful attempts to take a corrective action for the first virtual machine has been reached; and
   modify the one or more dependencies for the second virtual machine to remove or alter the dependency upon the first virtual machine, wherein the one or more dependencies for the second virtual machine are determined to have been met after removing or altering the dependency upon the first virtual machine.

* * * * *